US010843891B2

(12) United States Patent
Lima et al.

(10) Patent No.: US 10,843,891 B2
(45) Date of Patent: Nov. 24, 2020

(54) NANOFIBER YARN DISPENSER

(71) Applicant: Lintec of America, Inc., Richardson, TX (US)

(72) Inventors: Marcio D. Lima, Richardson, TX (US); Raquel Ovalle-Robles, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 240 days.

(21) Appl. No.: 15/830,186

(22) Filed: Dec. 4, 2017

(65) Prior Publication Data

US 2018/0187343 A1    Jul. 5, 2018

Related U.S. Application Data

(63) Continuation of application No. PCT/US2017/064122, filed on Dec. 1, 2017.

(Continued)

(51) Int. Cl.
| | |
|---|---|
| *B65H 51/16* | (2006.01) |
| *D02G 3/16* | (2006.01) |
| *D02G 3/40* | (2006.01) |
| *H01B 1/04* | (2006.01) |
| *D01F 9/127* | (2006.01) |
| *C01B 32/16* | (2017.01) |

(Continued)

(52) U.S. Cl.
CPC ............ *B65H 51/16* (2013.01); *B65H 49/20* (2013.01); *C01B 32/158* (2017.08); *C01B 32/16* (2017.08); *D01F 9/1275* (2013.01); *D02G 3/16* (2013.01); *D02G 3/406* (2013.01); *D02G 3/443* (2013.01); *H01B 1/04* (2013.01)

(58) Field of Classification Search
CPC ...................... C01B 32/158–178; B65H 51/16
See application file for complete search history.

(56) References Cited

U.S. PATENT DOCUMENTS

| | | |
|---|---|---|
| 3,111,270 A | 11/1963 | Winn, Jr. |
| 3,305,150 A | 2/1967 | Campbell et al. |

(Continued)

FOREIGN PATENT DOCUMENTS

WO    2015/176761    11/2015

OTHER PUBLICATIONS

International Search Report and Written Opinion received for Patent Application No. PCT/US2017/064122, dated Apr. 5, 2018, 24 pages.

(Continued)

*Primary Examiner* — Shaun R Hurley
(74) *Attorney, Agent, or Firm* — Greenblum & Bernstein, P.L.C.

(57) ABSTRACT

A dispenser is described for dispensing nanofiber yarns that includes a housing that defines an inlet, an outlet, and a chamber. A spool, around which is wound a length of nanofiber yarn, is disposed within the chamber defined by the housing. The nanofiber yarn is threaded from the chamber through the outlet and can be dispensed in a controlled way that reduces the likelihood of developing knots within the nanofiber yarn, and which facilitates convenient application of the yarn onto an underlying surface. In some cases, the dispenser can be used to concurrently dispense an adhesive or other polymer along with the nanofiber yarn.

19 Claims, 10 Drawing Sheets

Related U.S. Application Data

(60) Provisional application No. 62/442,698, filed on Jan. 5, 2017, provisional application No. 62/512,862, filed on May 31, 2017.

(51) Int. Cl.
  *D02G 3/44* (2006.01)
  *B65H 49/20* (2006.01)
  *C01B 32/158* (2017.01)

(56) References Cited

U.S. PATENT DOCUMENTS

| | | | |
|---|---|---|---|
| 3,612,427 A | 10/1971 | Bishop et al. | |
| 4,459,799 A * | 7/1984 | Beucher | H01B 13/02 57/13 |
| 5,052,636 A * | 10/1991 | Chesler | B65H 49/02 244/3.12 |
| 5,104,057 A * | 4/1992 | Chesler | B65H 49/02 242/128 |
| 5,123,075 A | 6/1992 | Renton | |
| 6,045,081 A | 4/2000 | Oberstrass et al. | |
| 6,331,080 B1 | 12/2001 | Cole et al. | |
| 9,666,796 B2 | 5/2017 | Liu et al. | |
| 2001/0030383 A1 | 10/2001 | Swanson et al. | |
| 2010/0148406 A1 | 6/2010 | Suzuki | |
| 2012/0251432 A1* | 10/2012 | Cooper | B01J 37/0215 423/447.3 |
| 2013/0316172 A1* | 11/2013 | Shanov | B82Y 30/00 428/367 |
| 2015/0167205 A1 | 6/2015 | Cooper | |
| 2015/0360424 A1* | 12/2015 | Williams | B05C 1/00 156/64 |

OTHER PUBLICATIONS

International Preliminary Report on Patentability received for Patent Application No. PCT/US2017/064122, dated Jul. 18, 2019. 10 pages.

\* cited by examiner

Nanofiber forest

Example reactor for growing nanofibers

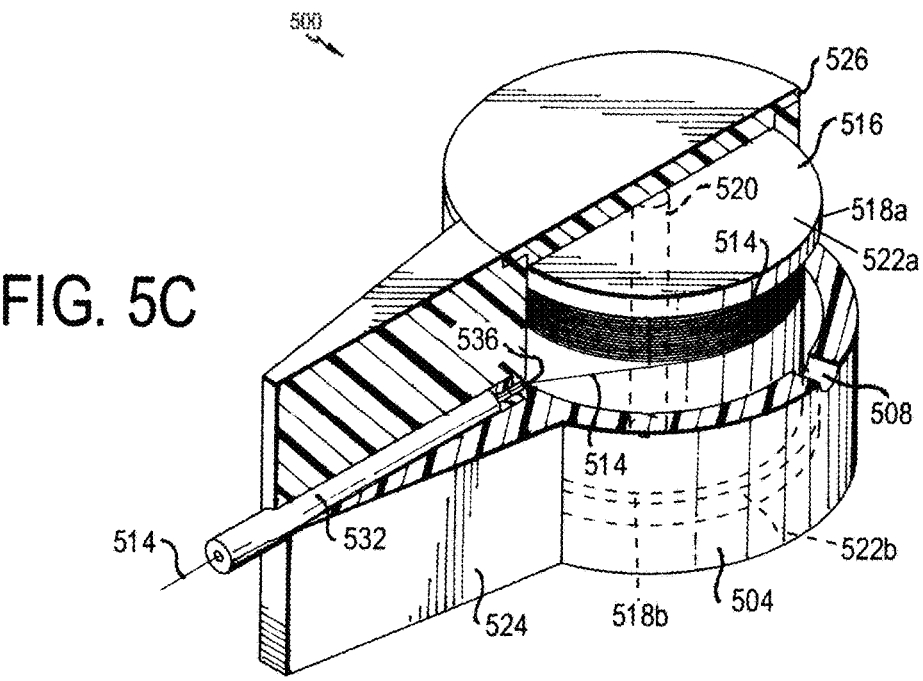
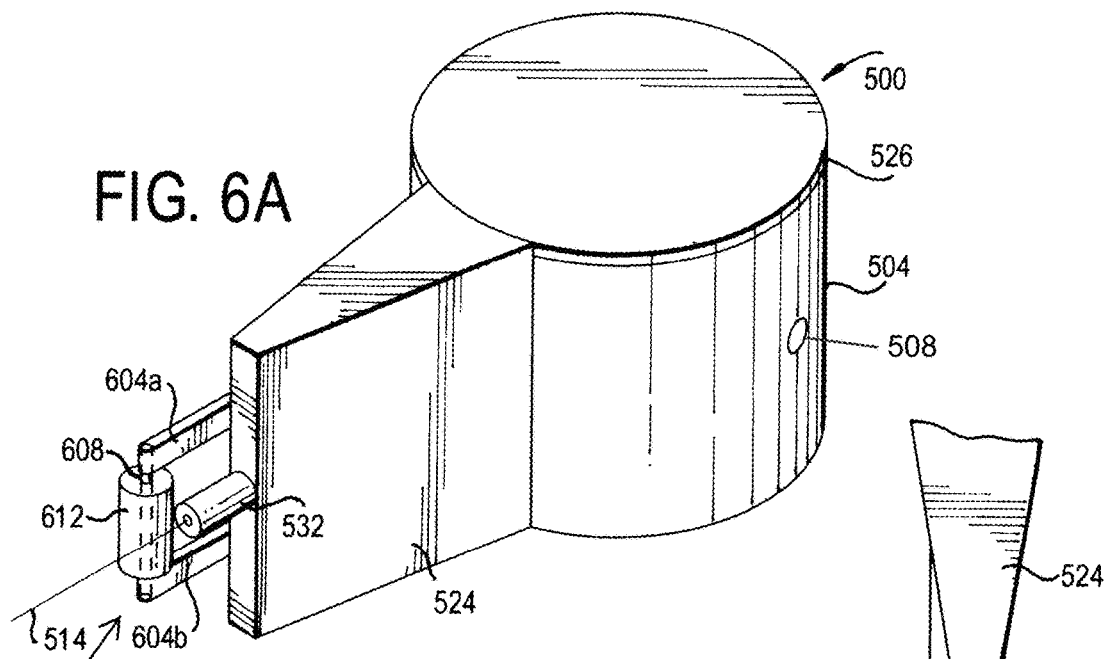
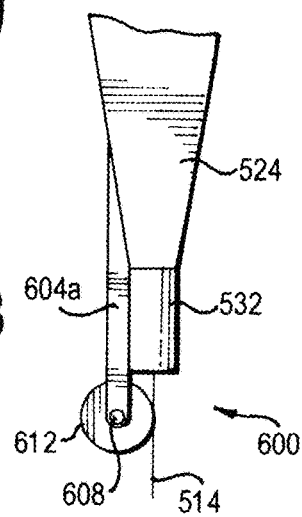

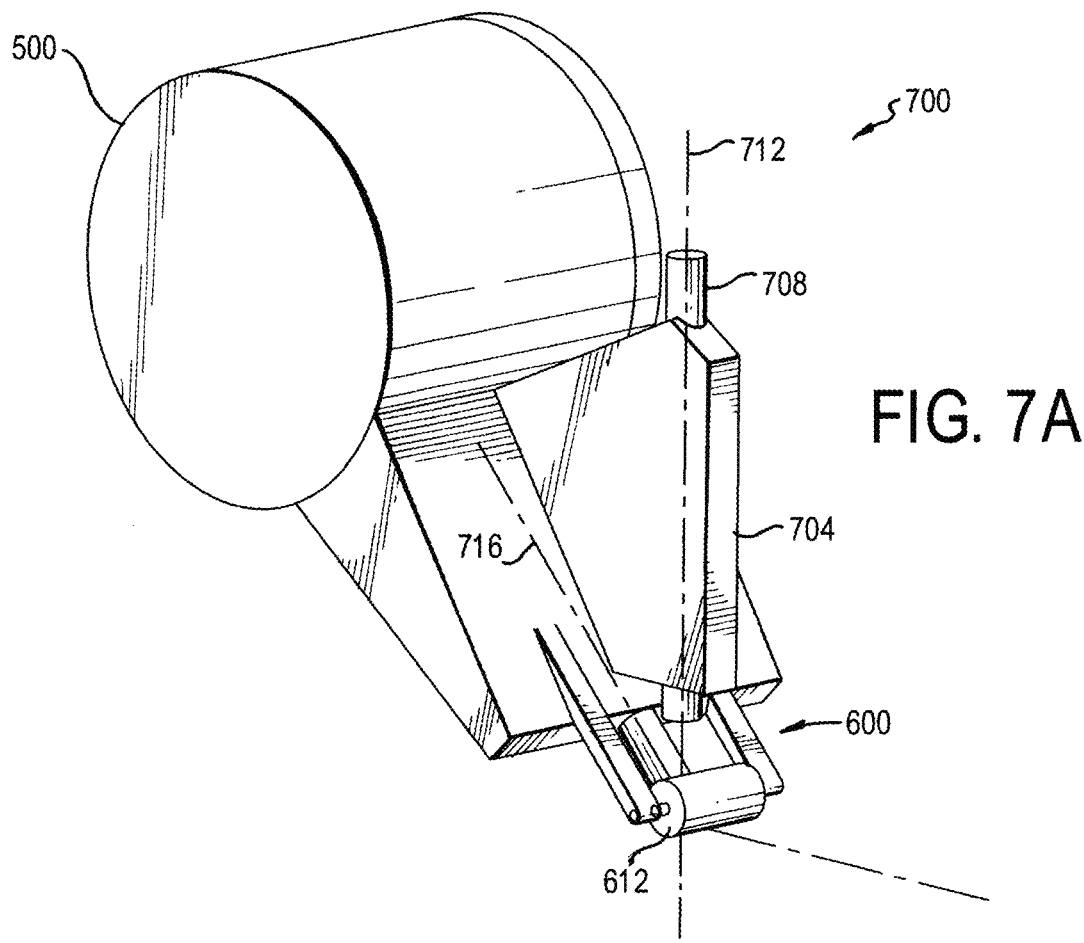
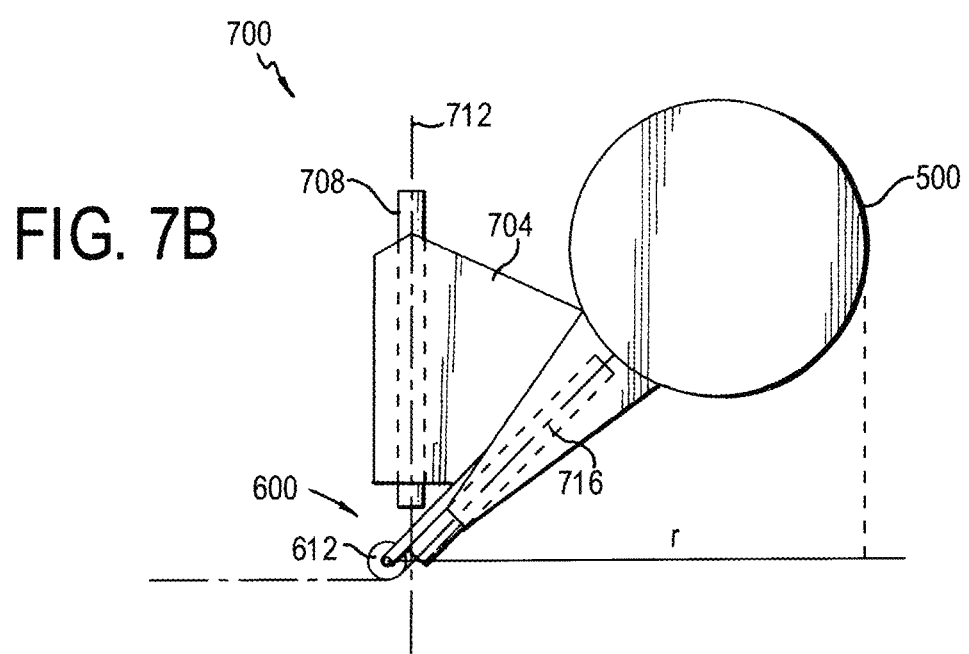

NANOFIBER YARN DISPENSER

RELATED APPLICATIONS

This application is a Continuation Application of PCT Application No. PCT/US2017/64122 filed Dec. 1, 2017, entitled "Nanofiber Yarn Dispenser," which claims priority under 35 USC § 119(e) to U.S. Provisional Patent Application Nos. 62/442,698 and 62/512,862, both of which are entitled "Nanofiber Yarn Dispenser." The applications were filed on Jan. 5, 2017 and May 31, 2017, respectively. All of these applications are incorporated by reference herein in their entireties.

TECHNICAL FIELD

The present disclosure relates generally to nanofibers and nanofiber yarns. Specifically, the present disclosure is related to nanofiber yarn dispensers.

BACKGROUND

Nanofibers are known to have unusual mechanical, optical, and electronic properties. However, nanofibers have yet to be integrated into many commercially available products despite their unusual properties. Nanofiber yarns are one form of nanofibers that may have commercial appeal due to the ability to tune the yarn properties by including materials and fibers within the nanofiber yarn other than the nanofibers themselves.

SUMMARY

One example of the present disclosure is an apparatus that includes a housing defining an inlet, an outlet, and a chamber. The apparatus also includes a pressurized gas source connected to the housing and in communication with the inlet. The apparatus also includes a spool disposed within the chamber. The apparatus also includes a nanofiber wrapped around the spool, the nanofiber having an average diameter of less than 100 microns. In one embodiment, an average diameter of the nanofiber is less than 1 micron. In one embodiment, the housing includes a hermetic seal except for the inlet and the outlet, the hermetic seal configured to prevent infiltration of fluid into the chamber except through the inlet and the outlet. In one embodiment, the outlet is dimensioned to prevent infiltration of water at 1 atmosphere of pressure into the housing through the outlet. In one embodiment, an inner diameter of the outlet is between 10 µm and 300 µm. In one embodiment, the housing further includes a fluid disposed within the chamber. In one embodiment the fluid is a polymer. In one embodiment, the fluid is an adhesive. In one embodiment, the adhesive is a methacrylate-based adhesive. In one embodiment, the apparatus further includes a nozzle connected to the housing, the nozzle defining a channel that is in communication with the outlet. In one embodiment, the apparatus further includes a liner disposed within the channel. In one embodiment, the liner has an inner diameter dimensioned to prevent infiltration of water. In one embodiment, a diameter of the liner is between 90 µm and 130 µm. In one embodiment, the liner is removable from the channel. In one embodiment, the apparatus further comprises a fluid flowing within the channel, and wherein a length of the liner is less than a length of the channel. In one embodiment, the apparatus further includes an axle disposed at a center of the spool that is configured to allow for rotation of the spool within the chamber. In one embodiment, the apparatus further includes a carbon nanofiber yarn disposed on the spool, the carbon nanofiber yarn having a free end proximate to the outlet of the housing and a fixed end proximate to the spool. In one embodiment, the carbon nanofiber yarn has a cross-sectional diameter of approximately 100 µm and a length between the free end and the fixed end of approximately 1 km, at least a portion of the length wound around the spool. In one embodiment, wherein the nanofiber yarn is fabricated from two or more individual nanofibers or nanofiber yarns that are twisted together form a plied nanofiber yarn. In embodiments, wherein the plied nanofiber yarn has a diameter from 0.5 microns to 100 microns. In one embodiment, the apparatus further includes a roller assembly. In one embodiment, the roller assembly further includes a support; a spindle connected to the support; and a roller disposed around at least a portion of the spindle. In one embodiment, the roller assembly further comprises a cleaning mechanism. In one embodiment, the roller assembly further comprises a first support and a second support; a first spindle connected to the first support, and a second spindle connected to the second support; a first roller disposed around at least a portion of the first spindle and a second roller disposed around at least a portion of the second spindle; and a belt disposed around the first roller and the second roller. In one embodiment, further comprising: a connector connected to at least one of the housing and a nozzle connected to the housing; and a drive shaft attached to the connector. In one embodiment, wherein a longitudinal axis of the drive shaft intersects a reference axis between a center point of the housing and a center point of the roller proximate to the roller. In one embodiment, wherein a radius of a cross-section of the drive shaft is less than a length measured from a center point of the roller to a corresponding point on a housing perimeter that is projected onto an underlying surface. In one embodiment, further comprising: a connector connected to at least one of the housing and a nozzle; and a drive rod attached to the connector. In one embodiment, wherein the drive rod is rotatably attached to the connector. In one embodiment, wherein the rotatable attachment is a bearing.

One example of the present disclosure is a method for dispensing a nanofiber that includes threading a free end of a nanofiber through a dispenser outlet, the threading including flowing a fluid into a chamber of a dispenser via an inlet defined by the dispenser, the fluid passing through the chamber and exiting the chamber through the dispenser outlet, the fluid carrying the free end of the nanofiber through the dispenser outlet; disposing a portion of the nanofiber proximate to the free end in contact with a roller attached to the dispenser; and applying a force to the nanofiber via the roller, the force causing the nanofiber to contact a substrate. In one embodiment, the method further includes threading the nanofiber through a channel defined by a nozzle, the channel in communication with the outlet and the nozzle attached to the dispenser. In one embodiment, the method further includes a liner disposed within the channel, the nanofiber threaded through the liner disposed within the channel. In one embodiment, further comprising stopping the fluid flow into the chamber upon the free end of the nanofiber passing through the liner; upon stopping the fluid flow into the chamber, flowing an additional fluid in a space between the liner and the channel, wherein a length of the liner is less than a length of the channel, and further wherein the flow of the additional fluid exerts a pressure on the nanofiber via the Venturi effect. In one embodiment, the method further includes wrapping a nanofiber with the free end around a spool; and disposing the spool within the chamber of the dispenser. In one embodiment, the nanofiber further comprises a nanofiber yarn. In one embodiment, the nanofiber yarn has a diameter of less than 100 microns. In one embodiment, the nanofiber yarn has a diameter of less than 1 micron. In one embodiment, the chamber is hermetically sealed except for the outlet and the inlet. In one embodiment, the fluid is a gas. In one embodiment, the fluid is a fluid adhesive. In one embodiment, applying the force to the nanofiber via the roller adheres the nanofiber to the substrate.

One example of the present disclosure is an apparatus that includes a nanofiber yarn dispenser; a translator assembly connected to the nanofiber yarn dispenser and configured to translate the nanofiber yarn dispenser, the translator assembly comprising: a coarse adjustment translator configured to translate the nanofiber yarn dispenser from 0.5 cm to 1 meter; and a fine adjustment translator configured to translate the nanofiber yarn dispenser from 100 microns to 5 millimeters. In an embodiment, the example further comprising a film source spool and a film update spool. In an embodiment, wherein the fine adjustment translator is connected to a flexible dispensing tube. In an embodiment, wherein the fine adjustment translator comprises a piezoelectric actuator. In an embodiment, wherein the fine adjustment translator comprises a electromagnetic actuator. In an embodiment, wherein the fine adjustment translator is configured for movement frequencies on the order of kilohertz. In an embodiment, further comprising a non-contact cutting system. In an embodiment, wherein the non-contact cutting system includes at least one electrode connected to a power source. In an embodiment, wherein the non-contact cutting system is an electrical arc system. In an embodiment, wherein the non-contact cutting system is a Corona discharge system. In an embodiment, further comprising a film to which the nanofiber yarn dispenser is configured to apply a nanofiber yarn. In an embodiment, wherein the nanofiber yarn is applied to the film as a plurality of parallel nanofiber yarn segments separated from each other corresponding 100 μm spaces. In an embodiment, wherein the non-contact cutting system is a laser system.

BRIEF DESCRIPTION OF THE DRAWINGS

FIG. 5C is a partial cross-sectional perspective view of the nanofiber yarn dispenser shown in FIG. 5A, in an embodiment.

FIG. 6A is a perspective view of a nanofiber yarn dispenser with an attached roller, in an embodiment.

FIG. 6B is a side view of a roller attached to a nanofiber yarn dispenser, in an embodiment.

FIG. 7A is a perspective view of a nanofiber yarn dispenser having a drive structure, in an embodiment.

FIG. 7B is a side view of a nanofiber yarn dispenser having a drive structure, in an embodiment.

Figure 1:
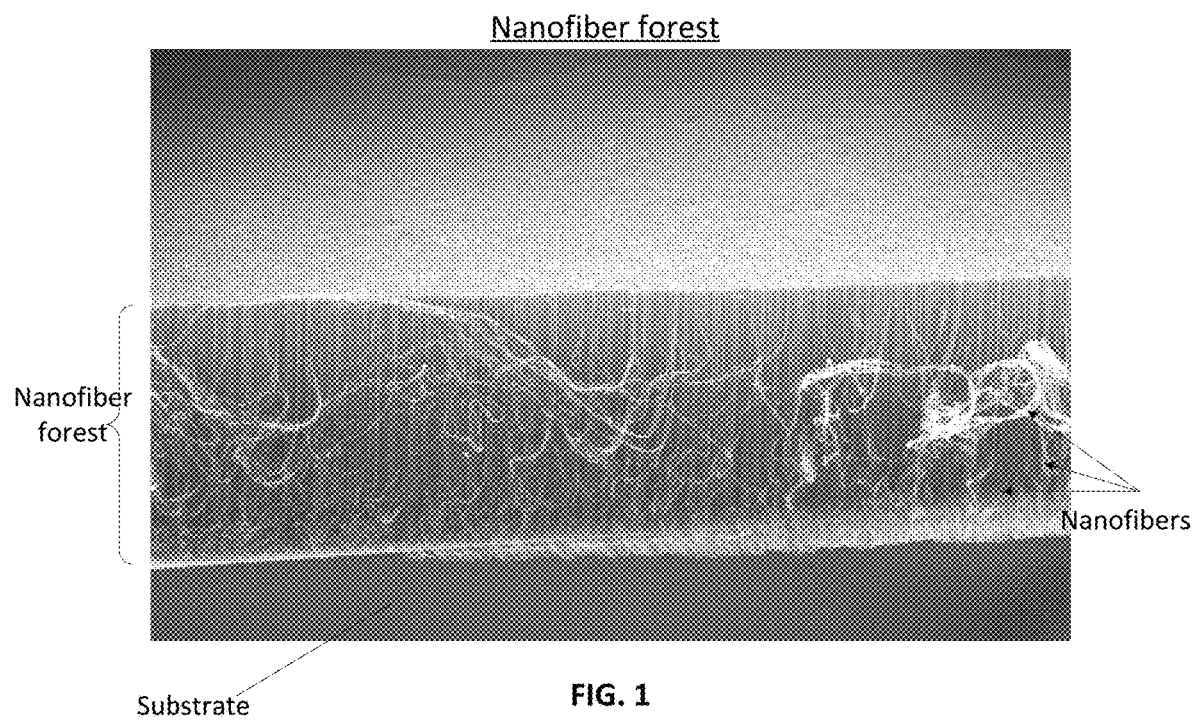
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Fabrication of nanofiber yarns is described in PCT Patent Application No. PCT/US2005/041031, published as PCT Publication No. WO/2007/015710, both of which are incorporated by reference herein in their entireties.

The manipulation of nanofibers and nanofiber yarns can be challenging. Nanofibers can have diameters in the tens of nanometers. Nanofiber yarns (collections of multiple nanofibers or plied yarns of multiple individual nanofiber yarns) can have diameters (or average diameters) as small as a few microns and have lengths that are over one kilometer (km). These relatively small diameters make nanofiber yarns difficult to see, let alone physically grasp, regardless of the length. Long nanofibers and nanofiber yarns further complicate manipulation and make it important to maintain an orderly organization within a strand—once tangled, both nanofibers and nanofiber yarns are nearly impossible to untangle or unknot.

Other challenges exist regarding the manipulation of nanofibers and nanofiber yarns. For example, because of their very low density, nanofibers and nanofiber yarns (regardless of their total length) are easily moved by air currents as subtle as those produced by a distant ventilation system, the opening of a door of a room in which the nanofiber yarn is disposed, or the breath of a person several meters away from the nanofiber yarn. Because many nanofiber yarns are more expensive per unit length than more traditional fibers and yarns used in textile manufacturing (e.g., cotton, rayon, nylon, linen) and most materials used in cables for structural applications (e.g., steel wire and cable), there is a higher financial cost to losing nanofibers to waste (e.g., caused by tangling or knotting).

Despite these challenges, there remains great interest in using nanofibers and nanofiber yarns in products and manufacturing processes because of their compelling mechanical, chemical, thermal, and electrical properties.

In light of this, embodiments of the present disclosure include a dispenser for dispensing nanofibers and yarns comprised of nanofibers (both of which will be referred to as "nanofiber yarns" for brevity). The dispenser includes a housing that defines an inlet, an outlet, and a chamber. A spool, around which a length of nanofiber yarn is wound, is disposed within the chamber. A gas source is in communication with the inlet defined by the housing. The gas source can then supply a gas at a positive pressure (e.g., greater than the ambient pressure around the housing) to facilitate dispensing the yarn from the dispenser through the outlet.

The dispenser of the present disclosure has a number of benefits. First, it provides a controlled way of dispensing and/or applying a nanofiber yarn in a way that minimizes waste. The dispenser also provides a structure that is more easily manipulated than the nanofiber yarn itself, thus improving the convenience with which nanofiber yarns are stored, handled, and manipulated. The nanofiber dispenser can also provide a convenient and safe storage container that retains the yarn in a dry, dust-free environment. The yarn can be stored in organized spool form that reduces the likelihood of the nanofiber yarn tangling. For these reasons and others, the dispenser improves the utility of the nanofiber yarn itself.

The dispenser has a number of features that contribute to its utility. Positive pressure supplied by the gas source into the housing can prevent unintentional or ill-advised attempts to rewind nanofiber yarn onto the spool and thus prevent tangling of the nanofiber yarn within the chamber. An additional feature, described below, can be connected to the spool to facilitate an orderly rewinding of the nanofiber yarn on the spool when desired.

The dispenser can prevent contamination of the nanofiber yarn by impurities that may otherwise degrade the mechanical, electrical, or thermal properties of the nanofiber yarn (e.g., abrasive particles or chemically active molecules). Furthermore, the dispenser can be used to conveniently locate a free end of the nanofiber yarn (i.e., an end of the nanofiber yarn not attached to, compressed against, mounted, or otherwise fixed on the spool), which can be difficult to find for small diameter nanofiber yarns, as described above.

The dispenser also provides a vehicle through which other materials may be conveniently applied to the nanofiber yarn. For example, an adhesive dispenser and a roller may be attached to or integrated with the dispenser. The adhesive (whether a solid, fluid, or gel) can be applied to the nanofiber yarn as it exits the dispenser. The roller can press the adhesive coated yarn onto a surface to which the nanofiber yarn is to be adhered as the yarn is being dispensed. In other embodiments, an adhesive or other chemical component can be contained in the housing itself so that the nanofiber yarn exits the dispenser with the chemical component already disposed on and/or impregnated in the nanofiber yarn.

Other embodiments described herein include nanofiber yarn dispensers that are configured to use the Venturi effect to facilitate dispensing the nanofiber yarn. Still other embodiments described herein include systems into which a nanofiber yarn dispenser is integrated, and that can apply a nanofiber yarn to a film or substrate in a pattern having feature sizes ranging from microns to meters.

Numerous other advantages will be apparent in light of the present disclosure.

Before describing embodiments of nanofiber yarn dispensers, properties and methods of synthesis of nanofiber forests, sheets, and drawn nanofibers will be described.

Properties of Carbon Nanofibers and Carbon Nanofiber Sheets

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Nanofiber Forest

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces.

Example Methods for Producing Nanofiber Forests

Various methods can be used to produce nanofiber forests in accordance with the present disclosure. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers.

Figure 2:
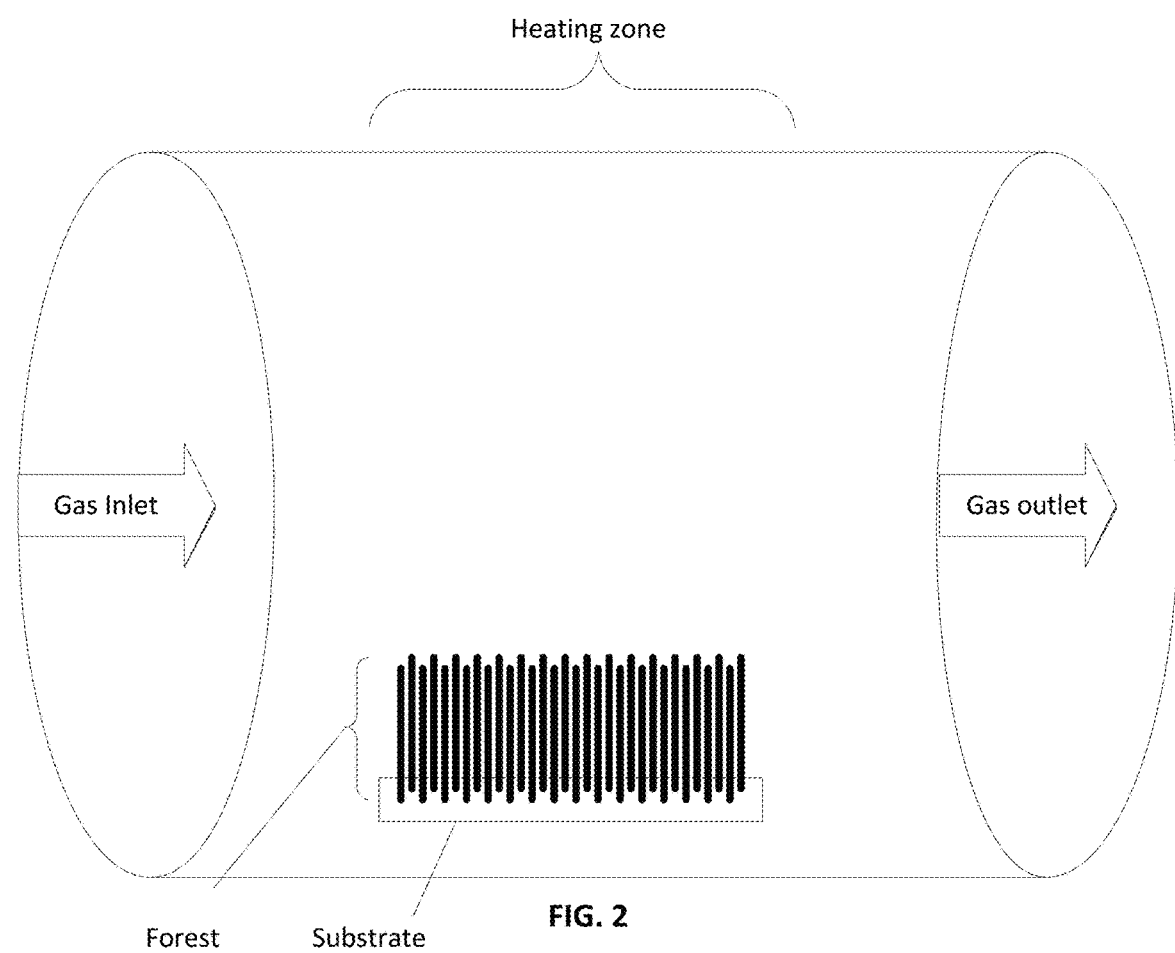
FIG. 2 is a schematic diagram of a reactor for growing nanofibers, in an embodiment.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gases may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream. Example methods of adding dopants during deposition of the nanofiber forest are described at paragraph 287 of PCT Publication No. WO 2007/015710, among other locations, and are incorporated by reference herein. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly(vinyl alcohol), poly(phenylene tetrapthalamide) type resins, poly(p-phenylene benzobisoxazole), polyacrylonitrile, poly(styrene), poly(ether etherketone) and poly(vinyl pyrrodidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having a desired pattern. For example, in some embodiments catalyst is deposited on the substrate in a pattern and the resulting forest grown from the patterned catalyst is similarly patterned. Exemplary catalysts include iron with a, buffer layer of silicon oxide (SiO$_2$) or aluminum oxide (Al$_2$O$_3$). These may be deposited on the substrate using chemical vapor deposition (CVD), pressure assisted chemical vapor deposition (PCVD), electron beam (eBeam) deposition, sputtering, atomic layer deposition (ALD), laser assisted CVD, plasma enhanced CVD, thermal evaporation, various electrochemical methods, among others.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to chemical vapor deposition (CVD) or any of the other techniques and additives/dopants presented above. In some embodiments, the nanofiber forest may be modified to form a patterned forest. Patterning of the forest may be accomplished, for example, by selectively removing nanofibers from the forest. Removal can be achieved through chemical or physical means.

Nanofiber Sheet

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

Figure 3:
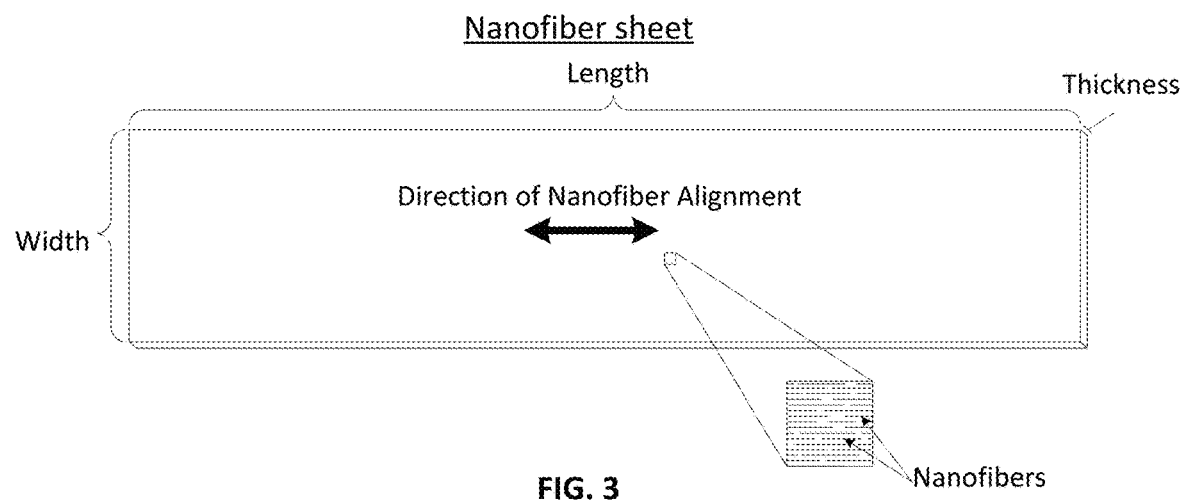
FIG. 3 is an illustration of a nanofiber sheet that identifies relative dimensions of the sheet and schematically illustrates nanofibers within the sheet aligned end-to-end in a plane parallel to a surface of the sheet, in an embodiment.

An illustration of an example nanofiber sheet is shown in FIG. 3 with relative dimensions illustrated. As can be seen in FIG. 3, the axis in which the nanofibers are aligned end-to-end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be stacked on top of one another to form a multi-layered sheet stack. Nanofiber sheets may be stacked to have the same direction of nanofiber alignment or to have different directions of nanofiber alignment. Any number of nanofiber sheets may be stacked on top of one another to form a multi-layered nanofiber sheet stack. For example, in some embodiments, a nanofiber sheet stack may include 2, 3, 4, 5, 10, or more individual nanofiber sheets. The direction of nanofiber alignment on adjoining sheets in a stack may differ by less than 1°, less than 5° or less than 10°. In other embodiments, the direction of nanofiber alignment on adjoining or interleaved sheets may differ by more than 40°, more than 45°, more than 60°, more than 80°, or more than 85°. In specific embodiments, the direction of nanofiber alignment on adjoining or interleaved sheets may be 90°. Multi-layer sheet stacks may include other materials such as polymers, metals and adhesives in between individual nonfiber sheets.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4.

Figure 4:
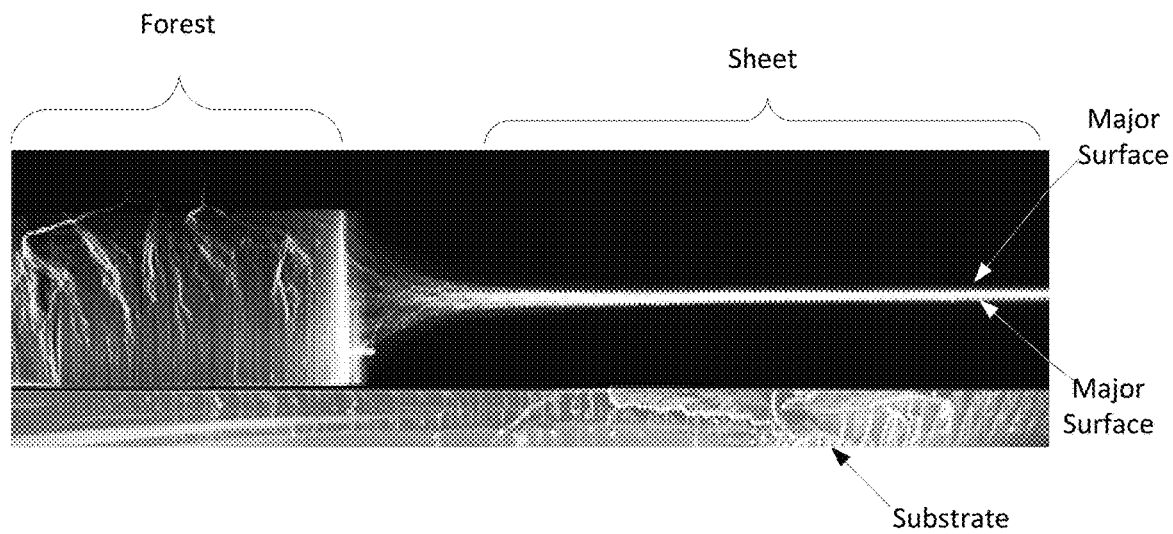
FIG. 4 is an image of a nanofiber sheet being laterally drawn from a nanofiber forest, the nanofibers aligning from end-to-end as schematically shown in FIG. 3.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, prior to metallization and/or polymer infiltration, as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Dispenser

Figure 5A:
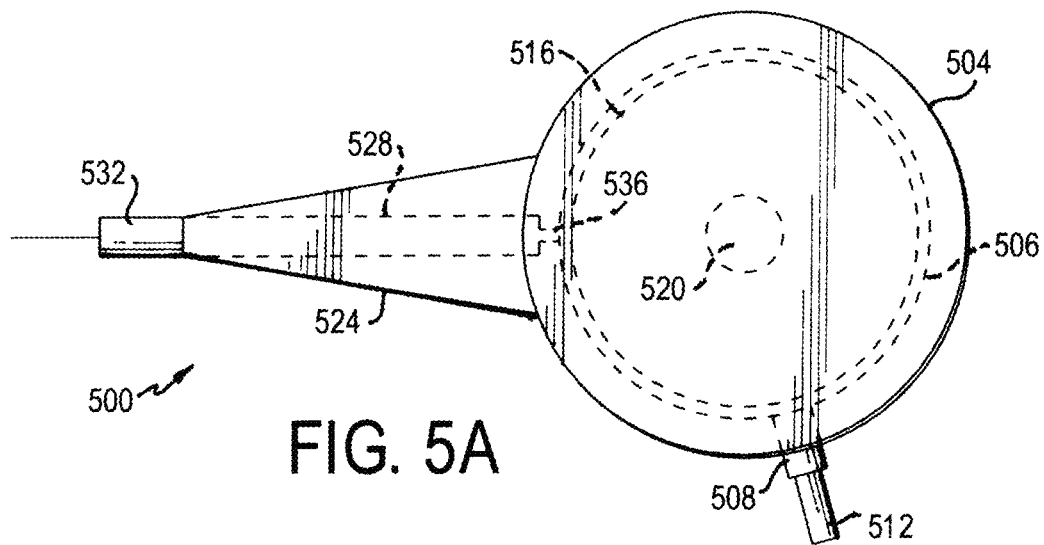
FIG. 5A is a side view of a nanofiber yarn dispenser, in an embodiment.
Figure 5B:
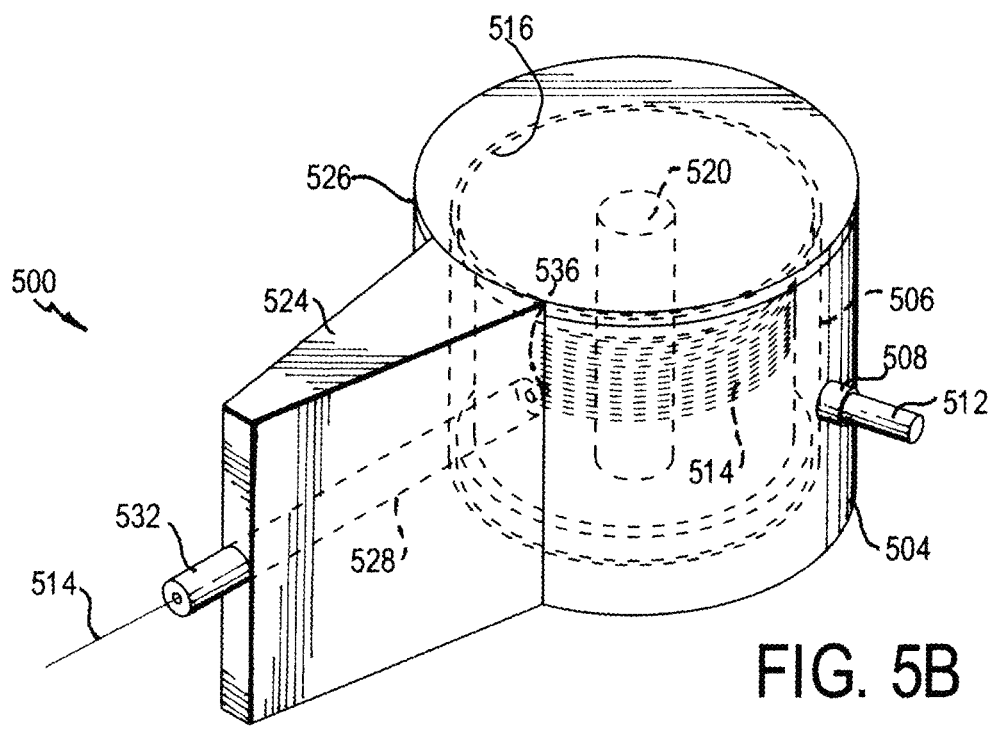
FIG. 5B is a perspective view of the nanofiber yarn dispenser shown in FIG. 5A, in an embodiment.

FIGS. 5A, 5B, 5C illustrate a side view and two perspective views, respectively, of one embodiment of a nanofiber yarn dispenser 500 that is configured to securely store and dispense nanofiber yarns in a way that improves the convenience of manipulation of the nanofiber yarn while reducing the probabilities of nanofiber yarn waste and contamination, as described above. Concurrent reference to these three figures will facilitate explanation. It will be appreciated that some of the described elements may appear in only one or two of FIGS. 5A, 5B, and 5C to aid clarity of depiction and description.

The dispenser 500 shown in FIG. 5A includes a housing 504, an inlet 508, a gas source 512, a spool 516, an axle 520, a nozzle 524, a liner 532, and an outlet 536. A nanofiber yarn 514 is shown in some views.

The housing 504 is configured to securely store and dispense nanofiber yarns by defining a chamber 506 within the housing 504 that is used to contain a spool of nanofiber yarn. The nanofiber yarn is protected from contamination by the housing and is dispensed through an outlet defined by the housing, as described below in more detail.

In one embodiment, the housing 504 is hermetically sealed (other than for the inlet 508 and an outlet 536 defined by the housing 504 and described below in more detail) so as to prevent unintentional ingress or infiltration of fluids (e.g., water, air) and contaminants. In some examples, the housing 504 is also sealed in a way that prevents unintentional egress of a fluid (whether gas, gel, polymer, swelled polymer, polymer solution, adhesive, adhesive polymer, or other fluid) stored within the chamber 506 from exiting the housing 504. Regardless of the purpose, the formation of a hermetically sealed housing 504 can be accomplished using any number of techniques including forming the housing 504 from a single piece of material via injection molding or additive manufacturing (also known as "3D printing"), sealing seams between adjoining portions of the housing 504 using an adhesive (e.g., siloxane polymer), or welding portions of the housing 504 together to seal the seams.

In one example, the housing 504 can be configured to include an access cover 526 (e.g., a door or cap, as illustrated in FIGS. 5B, 5C, and 6A) that is large enough to allow a spool 516 of nanofiber yarn to be inserted, removed, and/or replaced within the housing 504. The access cover 526 can be hermetically sealed to the housing 504 using, for example, a sealant such as silicone grease or a compressible gasket (e.g., a neoprene or silicone rubber gasket). The access cover 526 can be secured using a clamp, threaded bolts or screws, or other mechanism to apply and maintain pressure between the housing, the compressible gasket (not shown), and the access cover 526. In another embodiment the cover 526 includes threads that mate with complementary threads on the adjoining surface of the housing 504. The cover 526 may include a slot or series of indents that provide purchase to a wrench or screwdriver to allow the cover 526 to be tightened and loosened. The cover 526 may include an axial groove designed to accept an O-ring. The adjoining surface of the housing 504 may include a complementary groove designed to receive the O-ring when the two parts are joined. Alternatively, the access cover 526 of the housing 504 can be hermetically sealed using an adhesive (e.g., an epoxy, a methacrylate-based adhesive) or by melting, welding, or otherwise bonding the access cover 526 to the remainder of the housing 504. The seal may be permanent or temporary. As used herein, a seal is permanent if it cannot be readily unsealed without damage to the housing or cover. Regardless of the construction of the housing or the configuration of a hermetic seal and/or access cover 526, the housing 504 can protect the yarn from contamination.

Another advantage of a sealed housing 504 as described above includes the use of negative pressure (i.e., a vacuum) to locate a free end of a nanofiber yarn. For example, a spool having a free end of nanofiber yarn can be placed within a sealed housing 504. A vacuum can be applied at outlet 536 of the housing 504, which draws the free end of the nanofiber yarn from the chamber 506 as the vacuum removes any gaseous contents of the chamber 506. This process may also include allowing gas or fluid to flow through the inlet 508 and/or the gas source 512, into the chamber 506 and through the outlet 536, thus carrying the free end of the nanofiber yarn from the chamber 506 and through the outlet 536. Regardless, locating the free end of a nanofiber yarn using a vacuum and the flow of a fluid (liquid or gas) is helpful in manipulating nanofiber yarns because the free end of the nanofiber yarn can be located quickly, and without difficult manual inspection and/or manual manipulation. Once located, the free end of the nanofiber yarn can be engaged with machinery, applied to a surface, or otherwise act as a starting point for the controlled application of the nanofiber yarn using the dispenser 500.

The inlet 508 defined by the housing 504 is a passage through which fluid can flow. As indicated above, the inlet 508 can be used to provide a positive pressure and flow to the chamber 506 defined by the housing 504 that is used to move a free end of a nanofiber yarn through an outlet 536 of the dispenser 500.

The inlet 508 can also be used to provide other types of gasses or fluids to the housing 504 and within which a spool 516 of nanofiber yarn is disposed. For example, an inert gas (e.g., argon, nitrogen) can be introduced via the inlet 508. This may be done if, for example, a second material has been incorporated into the nanofiber yarn (e.g., metallic nanoparticles) that is susceptible to corrosion, degradation, or contamination from components in air (e.g., oxygen, water vapor, dust particles).

The gas source 512, which is optional, is in fluid communication with the inlet 508. As illustrated, gas source 512 is a tube that is connected to a portion of the housing 504 that is proximate to the inlet 508 (and sealed) so as to be integral with the housing 504. In this way, the gas source 512 enables a gas (or other fluid) to be provided to the chamber 506 through the inlet 508, while at the same time preventing infiltration of contaminants into the chamber 506. The gas source 512 may extend to any length as measured from the surface of the housing around the inlet 508 and may have any diameter. Lengths, diameters, and even the material used to fabricate the gas source 512 are selected based on the gas (or other fluid) to be provided, the configuration of fittings needed to connect to the source of the gas (or other fluid), among other factors. Desired gas velocity to volume ratios may also dictate the geometry of gas source 512 and inlet 508. Narrower passages will provide for faster gas velocity at the same gas flow rate. The composition of the gas source 512 and inlet 508 may also be selected based on the fluids that will be contacting the structures. For example, if an inert gas is to be provided through the gas source 512 through the inlet 508 into the housing, the gas tube may be fabricated using conventional polypropylene or polyethylene tubing and configured to connect to a conventional inert gas regulator. In another example, if a more chemically active material is to be provided, such as one that is corrosive or flammable, then a more chemical resistant and leak resistant material may be used, such as isoprene, stainless steel, among others. Gas source 512 may be temporarily attached to housing 504 and may be disposable so that the gas source 512 can be changed out for a replacement should it be damaged or clogged.

The spool 516 is configured so that a length of nanofiber yarn 514 may be wound around it and, once wound, disposed within the dispenser 500. The spool 516 is also configured to rotate while disposed within the chamber 506 defined by the housing 504 in response to the free end of the nanofiber yarn 514 being pulled from the dispenser 500.

To facilitate this rotation, the spool 516 may include a first cylindrical flange 518a and a second cylindrical flange 518b at each of a first end and a second end opposite the first end of the spool 516, as shown in FIG. 5C. The first cylindrical flange 518a and the second cylindrical flange 518b reduce the contact surface area between the spool 516 (and a nanofiber yarn wound around the spool 516) and an inner surface of the housing 504, thus reducing any contact-induced friction that would otherwise inhibit the rotation of the spool 516 within the housing 504. The first cylindrical flange 518a and the second cylindrical flange 518b may be comprised of low friction materials such as PTFE or graphite. The flanges may also be lubricated to further reduce contact-induced friction. Lubricants that reduce friction and drag on the performance of the nanofiber yarn include, but are not limited to polyethylene tetrafluoride (PTFE) based materials and graphite based materials.

In one example, the axle 520, which is optional, is a cylindrical structure disposed at a center of a circular cross-section of the spool 516 that reduces contact-induced friction between the spool 516 and the housing 504. Axle 520 can be passive, meaning that it is stationary with respect to rotation of the spool, or it can be active, meaning that it rotates to facilitate rotation of the spool. The benefits of including the optional axle 520 include centering the spool in the housing, increasing the speed of rotation for a given unit of applied force and/or reducing a force needed to withdraw nanofiber yarn 514 from the spool 516. Another benefit of the axle 520 is that it reduces surface area to which lubricant is applied, thus reducing the amount of lubricant introduced into the chamber 506 defined by the housing 504 and thus reducing the likelihood of contamination of the nanofiber yarn by lubricant.

In one example, the axle 520 can be removably disposed through a center hole in the spool 516. For example, the axle 520 can be configured with a first portion having a first diameter and two second portions on opposing sides of the first portion, each of the second portions having a second diameter that is less than the first diameter. The first portion having the larger first diameter is dimensioned to form an interference fit with a hole through a center of the spool 516, thus forming a hub that fits within the spool 516. Both of the second portions having the smaller second diameter can be configured to fit within corresponding features on interior surfaces of the chamber 506 that facilitates rotation of axle 520. In another example, the axle 520 has a uniform diameter across its entire length.

In another example, the axle 520 can be connected to, and/or integral with, the faces 522a and 522b of the spool 516 (shown in FIG. 5C). This unitary spool 516 and axle 520 structure is configured to rotate within the chamber 506 by, for example, disposing portions of the axle 520 on or within corresponding cradle or port structures attached to interior surfaces of the chamber 506 that can receive ends of axle 520 and thus reduce contact-induced friction between the spool 516 and axle 520 and the chamber 506.

In another example, the axle 520 can be connected to one or both of the interior surfaces of the chamber 506 that confront the faces 522a and 522b of the spool 516 and configured to contact corresponding features (such as a cup or cradle that can hold an end portion of the axle 520, not shown) disposed on the faces 522a and 522b of the spool 516. Axle 520 can be integral to access cover 526 or can be integral with housing 504. For example, axle 520 can extend from access cover 526 or can extend from the inner surface of wall of the housing 504. In another embodiment, a portion of the axle is integral to access cover 526 and a complementary portion of axle 520 is integral to the housing. The complementary axle portions can be connected together, e.g., by threads, and axle 520 can therefore serve as a connector for securing access cover 526 to housing 504. In this case, rotation of access cover 526 can result in the joining of the two portions of axle 520 and also in the sealing of the access cover 526 to the housing 504. Other variations of the configuration, dimensions, length, and shape of the optional axle 520 are also possible.

The axle 520 may be optionally connected to a handle (not shown) that is disposed on an exterior of the housing 504 through a sealed port. Mechanisms of sealing are discussed above in the context of the housing 504 and are applicable to this feature also. A connection between the handle and the axle 520 allows a direction of rotation of the spool 516 to be reversed, thus re-winding nanofiber yarn previously removed from the dispenser 500.

The nozzle 524 is attached to the housing 504 or otherwise integral with the housing 504. The optional nozzle 524 is shown in the embodiment of FIGS. 5A, 5B, 5C, 6A and 6B to illustrate some of the advantages of including the nozzle 524 rather than dispensing the nanofiber yarn directly from the outlet 536 in the housing 504.

The nozzle 524 defines a channel 528 that is in communication with the outlet 536 defined by the housing 504. The channel 528 has a diameter that is large enough to contain a portion of the elongated nanofiber yarn as it is being unwound from the spool 516, but small enough to prevent the flexible and compliant nanofiber yarn from being pushed back into chamber 506. In some examples, an inside diameter of the channel 528 is 10%, 15%, 25%, 50%, 100%, 250%, or values therebetween larger than an outside diameter of a nanofiber yarn used therein to accomplish this feature. The channel 528 also can have an opening (i.e., an inner diameter of the opening) opposite that of the outlet 536 that is small enough to prevent infiltration of water. That is, the opening of the channel can be small enough so that the surface tension of water prevents water droplets from wetting the interior surface of the channel 528. One example of a relationship used to calculate the radius of the channel that can prevent water infiltration follows in Equation 1.

$$r = 2\gamma/\Delta P \quad \text{Equation 1}$$

where r is the radius of the opening that prevents water infiltration, $\gamma$ is surface tension of the water, and $\Delta P$ is the difference in pressure between the interior of a droplet and an exterior surface of the droplet. In some examples, $\Delta P$ is proportional to the acceleration due to gravity (9.81 meters/second$^2$) and the density of water (approximately 1000 kg/m$^3$ at 1 atmosphere of pressure and "standard" temperature (i.e., 0° C.). In some examples, a surface tension of water (or other liquid material) on a surface of the nozzle 524 can affect infiltration of water into the channel defined by the nozzle 524. For example, low surface energy materials such as silicone and polytetrafluoroethylene, as well as other materials having a similarly low surface energy and/or similarly hydrophobic will help prevent infiltration of water.

Including the channel 528 also facilitates flow of gas provided through the inlet 508 that can be used to locate a free end of nanofiber yarn disposed within the chamber 506 and "thread" the yarn out of the outlet 536 and through the channel 528 for subsequent use.

The optional liner 532 is configured to fit within the channel 528. This is illustrated in the partial cross-sectional perspective view of FIG. 5C. The liner 532 provides an alternative surface within which a nanofiber yarn may exit the dispenser 500. The liner 532 may be removable so as to be conveniently replaced. For example, the channel 528 defined by the nozzle 524 may be dimensioned to have a size much greater than that desired for most nanofiber yarns. In one example, a liner 532 has an outside diameter sufficiently large to form an interference fit with an interior surface of the channel 528 and has an interior (or inner) diameter sufficiently small to provide a channel for a nanofiber yarn that reduces the risk of tangling of the nanofiber yarn and/or prevents infiltration of water, as described above. Different liners 532 having different interior diameters can be subsequently inserted into the channel 528 to correspond to different diameter nanofiber yarns. Generally, the diameter of a liner 532 (or of the channel 528 if the liner 532 is not used in the dispenser 500) can be at least 50% larger than the diameter of a nanofiber yarn sought to be dispensed through the liner 532 from the dispenser 500. In other examples, the diameter of the liner 532 (or the channel 528) is 70% to 100% larger, or from 100% to 200% larger than the diameter of a nanofiber yarn sought to be dispensed through the liner 532 from the dispenser 500. In one example a 30 μm diameter nanofiber yarn can be dispensed through a 50 μm diameter liner. In another example a 100 μm diameter nanofiber can be dispensed through a 200 μm diameter liner. It will be appreciated that the diameters of the channel 528 and the line 532 can be selected in coordination for embodiments in which both are used.

Another advantage of the liner 532 is that it provides an easily replaced surface through which a nanofiber yarn can be dispensed. This is particularly helpful for embodiments of the dispenser 500 that have a polymer, air-activated adhesive (e.g., methacrylate-based adhesives), other adhesive (e.g., a pressure sensitive adhesive, an epoxy, an elastomeric adhesive, sol gel precursors), and/or high surface area graphene flakes, graphene oxide, or other filler particles disposed within the adhesive that improve adhesion to a substrate or between overlapping yarns, solvent, or other fluid component disposed within the chamber that can also occupy, and potentially occlude, the channel 528. When using the liner 532, any occlusion can be removed by simply removing the occluded liner 532, replacing it with a clean liner 532, and re-threading the nanofiber yarn in the clean liner 532 using techniques described above.

The outlet 536, as described above, is defined by the housing 504 and provides an opening through which a nanofiber yarn can pass when being dispensed from the dispenser 500. The outlet 536 can be in communication with one or more of the channel 528 and the liner 532, as described above.

In addition to those features of the dispenser 500 already described above, FIGS. 6A and 6B illustrated an embodiment of the dispenser 500 that includes a roller assembly 600 that facilitates application of nanofiber yarn onto a surface. The roller assembly 600 includes supports 604a and 604b (collectively 604), a spindle 608, and a roller 612.

The supports 604 are connected to and extend from, in this embodiment, the nozzle 524 although in other embodiments the supports 604 can be connected to and extend from the housing 504 of the dispenser 500 itself. The supports 604 provide a structure between which a spindle 608 is disposed. The spindle 608 performs a similar function to the axle 520 described above. That is, the spindle 608 provides a structure that enables the roller 612 to rotate. As described above in the context of the axle 520, the spindle 608 can be a separate structure disposed through the roller 612, a structure that is integral with the roller 612, or structures connected to each of the supports 604 and that are configured to connect to the roller 612 while still enabling the roller 612 to rotate.

The roller 612 rotates so that it can apply pressure to a nanofiber yarn 514 disposed on a surface after the nanofiber yarn has been dispensed from the dispenser 500. The pressure applied to the nanofiber yarn 514 by the roller 612 can improve consistency and/or an extent of physical contact between the nanofiber yarn 514 and an underlying surface. Application of pressure to the nanofiber yarn 514 from the roller 612 may also improve adhesion between a nanofiber yarn 514 and an underlying surface, including cases in which: (1) an adhesive is disposed on the underlying surface prior to application of the nanofiber yarn 514; (2) an adhesive is disposed on the nanofiber yarn 514 prior to application of the nanofiber yarn to the surface; and (3) an adhesive is applied after the application of the nanofiber yarn 514 is disposed on a surface. In examples in which the adhesive is a pressure sensitive adhesive, the roller 612 can provide the pressure used to activate the pressure sensitive adhesive.

In some examples, application of pressure to the nanofiber yarn 514 by the roller 612 improves electrical contact between the nanofiber yarn 514 and the underlying surface. That is, by improving the extent of physical contact between the nanofiber yarn 514 and an underlying surface (e.g., by removing gaps and/or increasing contact area between the nanofiber yarn 514 and the underlying surface), the electrical contact is also improved (i.e., interfacial resistance is reduced).

The pressure applied by the roller 612 can also be used to reduce the occurrence of the nanofiber yarn being displaced by air currents or thermal variations during dispensing.

In some embodiments, an optional dispenser (not shown) is used to provide a fluid (e.g., a polymer, an adhesive) to the nanofiber yarn 514 after the nanofiber has been dispensed from the dispenser 500. In other embodiments, a separate cleaning mechanism (e.g., a scraper, a vacuum, and solvent wash) can be used to clean the nanofiber yarn 514 and or the roller 612, thus removing contaminants and/or excess fluid/adhesive.

Figure 6C:
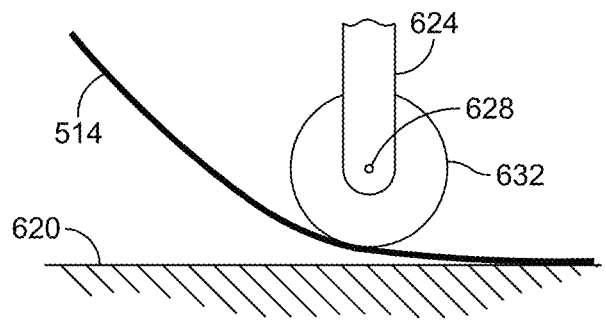
FIGS. 6C, 6D, and 6E illustrates various structures for causing contact between a nanofiber yarn and an underlying surface, in embodiments.
Figure 6D:
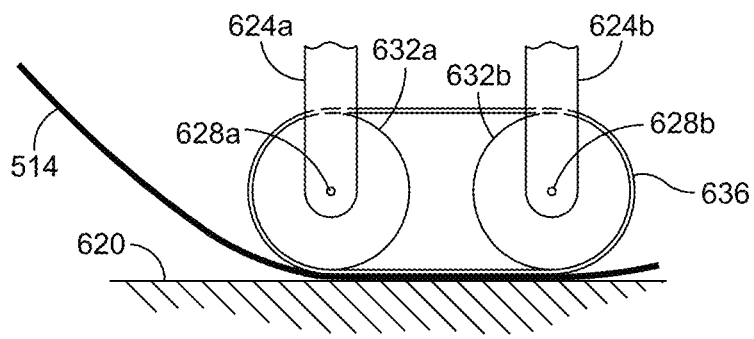
Figure 6E:
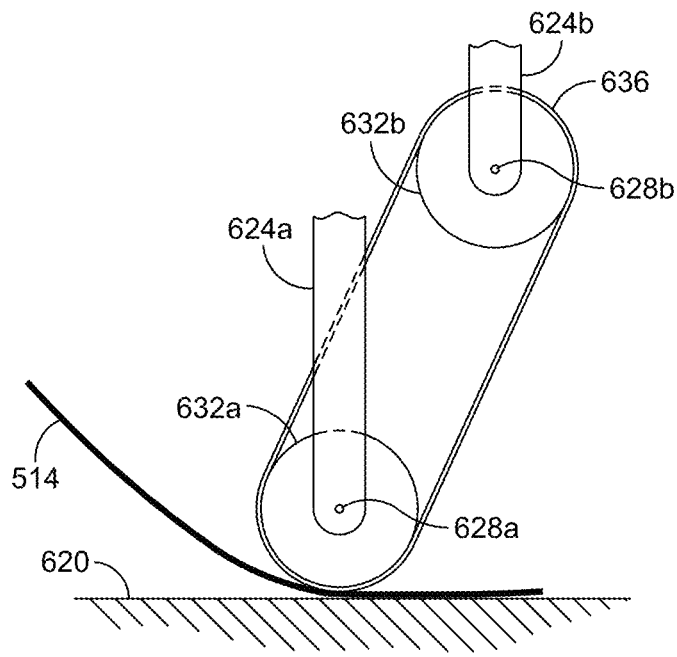

FIGS. 6C, 6D, and 6E illustrate various embodiments for mechanisms used to improve physical contact between the nanofiber yarn 514 and an underlying surface 620.

FIG. 6C illustrates a roller assembly that is not directly connected to the dispenser 500. In this example, a roller 632 is connected to one or more supports 624 via a spindle 628. Similar to the embodiment described above in the context of FIGS. 6A and 6B, the roller 632, applies pressure to the nanofiber yarn 514 so as to compel physical contact between the nanofiber yarn 514 and the underlying surface. However, unlike the embodiments described above, the support 624 need not be directly (or even indirectly) connected to the body of the dispenser 500 or the nozzle 524 of the dispenser 500.

FIG. 6D illustrates another embodiment in which pressure is applied to a nanofiber yarn 514 to improve physical contact between the nanofiber yarn 514 and the underlying surface 620. However, unlike the preceding examples, the pressure applied to the nanofiber yarn 514 is applied via a belt. In this example, two supports 624a and 624b are connected to rollers 632a and 632b via spindles 628a and 628b. The rollers 632a, 632b are not in direct physical contact with the nanofiber yarn. Instead, the rollers 632a, 632b apply a compressive force and rotational movement to the belt 636, which is in contact with both of the rollers 632a, 632b. The rotational movement of the rollers 632a and 632b causes the belt 636 to revolve around both of the rollers. The belt 636 is in direct contact with the nanofiber yarn 514 and applies the compressive force to the nanofiber yarn 514 from the rollers 632a, 632b. This can provide a more even distribution of compressive force to the nanofiber 514 over a longer length of the fiber, which can improve adhesion with the underlying surface 620 in some cases.

FIG. 6E includes the elements introduced in FIG. 6D. However, the embodiment in FIG. 6E provides a compressive force using only a portion of the belt 636 that is between the underlying surface 620 and the roller 632a. This embodiment can increase a force per unit area applied to the nanofiber 514 while still increasing contact surface area compared to the roller alone (e.g., such as the embodiment depicted in FIGS. 6A and 6B). In some embodiments the belt 636 can also be used to clean the nanofiber yarn 514 prior to application (e.g., by removing particles, detritus, excess polymer). In other embodiments, a separate cleaning mechanism (e.g., a scraper, a vacuum, and solvent wash) can be used to clean the nanofiber yarn 514 and or the belt 636/ rollers 632a, 632b to remove contaminants and/or fluid/ adhesive.

In some embodiments, a heater or adhesive curer (not shown) may also be used with the dispenser 500 and with any of the preceding embodiments. The heater/adhesive curer can be affixed to or mounted on the dispenser 500 (e.g., on the nozzle 524, on the housing 504, supports 624, 624a, 624b) or used as a separate device from the dispenser 500. The heater/adhesive curer can dry or cure an adhesive that is used in conjunction with the nanofiber yarn 514. Example types of heater can include electrical resistance heaters that use one or more of a radiant heating method and a forced air heating method and infra-red (IR) wavelength heaters. Other example types of adhesive curers that cause hardening of an adhesive via a mechanism other than application of heat include UV devices, other optical wavelength devices. It will be appreciated that many other types of mechanisms and corresponding devices can be used with the dispenser 500 according to a type of adhesive used.

Drive Structure

Embodiments of the dispenser 500 described above can dispense nanofiber yarn in any direction. For these embodiments, an orientation of the dispenser 500 (and thus a direction in which the nanofiber yarn is applied to a substrate) can be changed by applying a lateral force to the dispenser housing 504, thus pivoting the dispenser about the roller 612. This technique of changing direction of the dispenser 500 can be inconvenient. For example, maintaining contact between the roller 612 and a substrate while simultaneously changing direction of the dispenser 500 as a whole can be difficult. Also, a length of an arc through which the housing 504 must be moved to change direction is relatively large. This is because, when pivoted around the roller 612, the housing 504 must transcribe an arc of a circle that has a radius "r" as indicated in FIG. 7B. This radius r is equal to a length projected onto an underlying surface (similar to a cosine component of an angle) that is between a center of the roller 612 and a point on a perimeter of the housing 504 directly opposite the longitudinal axis (as shown in FIG. 7B).

To improve the convenience of changing the direction of the dispenser 500, and thus the nanofiber yarn 514 application, FIG. 7A depicts a perspective view of a nanofiber yarn dispenser 700 having a drive structure (or "drive shaft") 708, in an embodiment.

The yarn dispenser 700 includes some or all of the various elements of the yarn dispenser 500 described above, and in addition a connector 704 and a drive rod 708.

The connector 704 connects to one or more of the housing 504 and the nozzle 524 and provides a structure to which the drive rod 708 is attached. While the connector 704 shown is that of a plate that connects to both of the housing 504 and the nozzle 524, this is not necessarily the case. Other embodiments of the connector 704 include, but are not limited to, a plate that connects to only one of the housing 504 or the nozzle 524, one or more rods connected to the dispenser 500 configured also to connect to the drive rod 708, among others.

In some embodiments, the drive rod 708 is coupled with the connector 704 so that the drive rod 708 can rotate relative to the connector 704. While not shown, the mechanisms that can be used to facilitate this connection include, but are not limited to, bearings, hinges, bolts, pins, among others. In other embodiments, the drive rod 708 is fixed relative to the connector 704. The drive rod 708 can be fixed to the connector 704 using, for example, adhesives, set screws, pressure fit or a threaded interface. For these embodiments, a rotatable connection (e.g., a bearing) can connect a motor or other structure for moving the dispenser 700 via the drive rod 708. For example, if the yarn dispenser 700 is integrated into a machine with mechanisms to manipulate and move the yarn dispenser 700, a bearing can connect the drive rod 708 (fixed relative to the connector 704) to the machine, thus enabling rotation and movement of the yarn dispenser 700.

The drive rod 708 is positioned so that a longitudinal axis 712 of the drive rod 708 intersects a reference axis 716. The reference axis 716 is shown as being from the center of the housing 504 to the center of the roller 612. In particular, the intersection of the longitudinal axis 712 and the reference axis 716 is a point proximate (from housing 504) to the roller 612. As a result, the axis of rotation of the dispenser can be longitudinal axis 712 and may fall between roller 612 and housing 504. In some cases, the distance between longitudinal axis 712 and the transverse axis of roller 612 can be, for example, 1-50 mm, 1-30 mm, 1-20 mm, 5-50 mm, 5-40 mm, 5-30 mm or 5-20 mm.

Disposing the drive rod 708 proximate to the roller 612, as described above, so that the axis of rotation is between the roller 612 and the housing 504 enables rotation of the dispenser 700 with an improved turning radius. In other words, the roller 612 will maintain contact with the underlying substrate during a change in direction while the remainder of the dispenser 700 will arrange itself in response to an applied force and/or acceleration. For non-linear yarn dispensing, the path of the drive rod 708 will more closely match the path of the yarn than does the housing 504 of the dispenser. Thus, the drive rod 708 can be moved in a pattern that will be copied, or almost copied, by the path of the yarn on the substrate. This configuration can be particularly helpful for integrating the dispenser 700 (or dispenser 500) with automated equipment.

Alternative Embodiments

Figure 8A:
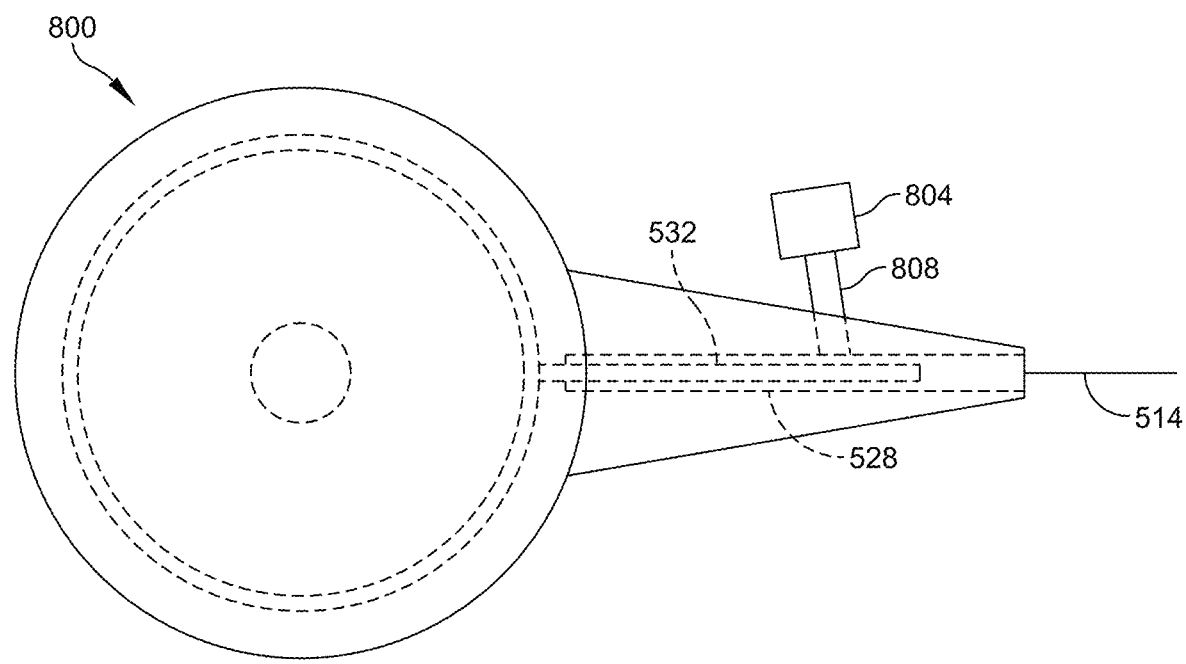
FIG. 8A illustrates an alternative embodiment of a nanofiber yarn dispenser in which the Venturi effect is used to dispense nanofiber yarn from a dispenser, in an embodiment.

FIG. 8A illustrates an alternative embodiment 800 of the nanofiber yarn dispenser in which the Venturi effect is used to dispense nanofiber yarn from the dispenser 800. The dispenser 800 includes, in addition to various elements of the dispenser 500 described above, a fluid source 804 and a connector 808. The fluid source (e.g., from a reservoir or other container) provides a flowing fluid via the connector 808 to the channel 528. As shown, the connector 808 can be disposed proximate to a dispensing end of the channel 528. Application of the fluid as shown in FIGS. 8A and 8B can help dispense the nanofiber yarn 514 from the dispenser 800 via the Venturi effect.

Figure 8B:
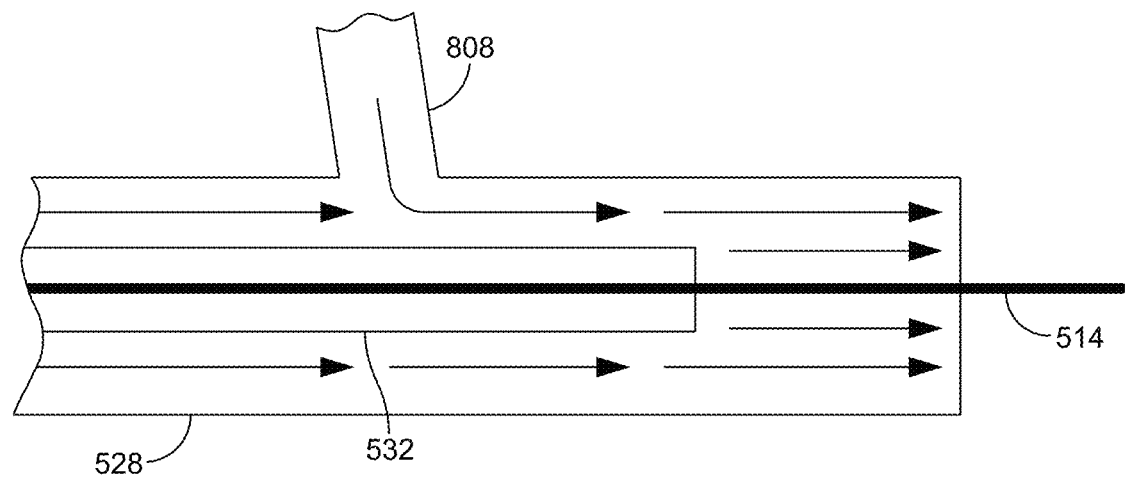
FIG. 8B schematically illustrates the Venturi effect dispensing a nanofiber yarn from a dispenser, in an embodiment.

The role of the Venturi effect on dispensation of the nanofiber yarn 514 is shown schematically in FIG. 8B. As indicated by arrows, fluid (whether a liquid or gas) flows, for a time, in a space between and defined by the channel 528 and the liner 532 and is confined to a restricted volume. In this embodiment of the dispenser 800, the restricted volume is caused by the liner 532 being disposed within the channel 528. However, because the liner 532 is shorter than the channel 528, the pressure of the fluid drops beyond the terminal end of the liner 532, thus providing a low pressure zone that applies a drawing force to the nanofiber yarn 514, pulling it out of the channel 528 in accordance with the Venturi effect. A pump or other mechanism can be used to control the rate of fluid flow from the fluid source 804 and thus through the channel 528, which in turn affects the force exerted on the nanofiber yarn and thus the rate at which the nanofiber yarn 514 is drawn from the dispenser 800.

Figure 9A:
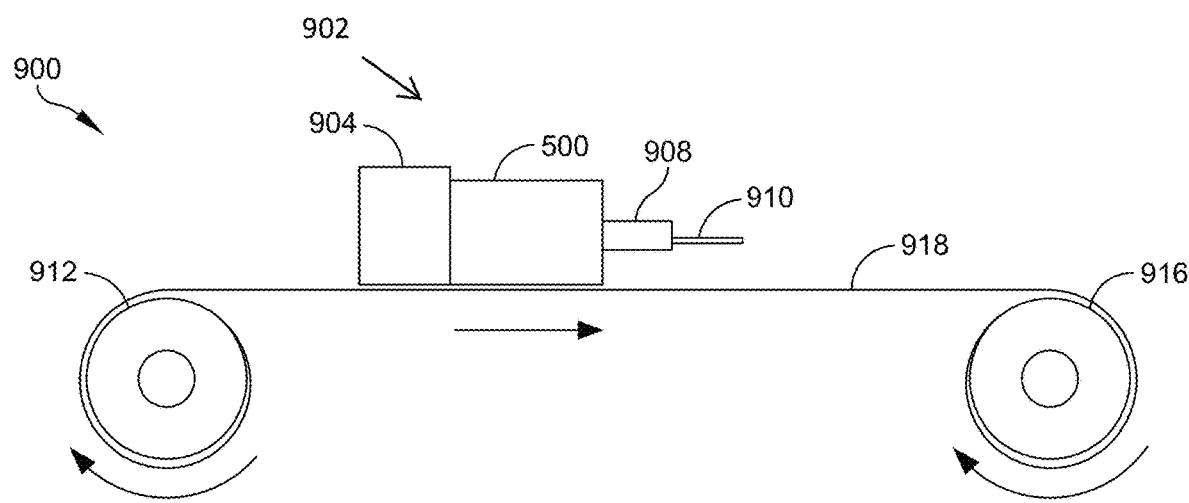
FIG. 9A illustrates a side view of an assembly used to apply nanofiber yarn to a substrate, in an embodiment.
Figure 9B:
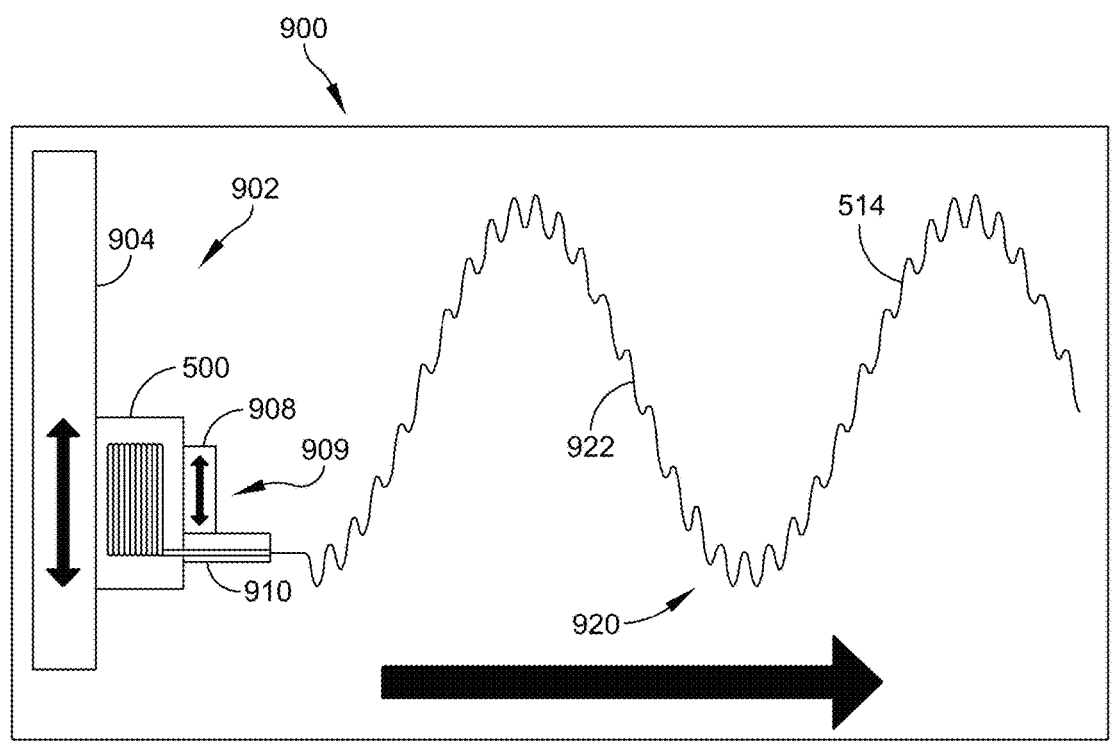
FIG. 9B illustrates a plan view of the assembly of FIG. 9A used to apply nanofiber yarn to a substrate, in an embodiment.

FIG. 9A illustrates a side view of a system 900 used to apply nanofiber yarn to a substrate, in an embodiment. FIG. 9B illustrates a plan view of the system 900 depicted in FIG. 9A. Concurrent reference to FIGS. 9A and 9B will facilitate explanation.

The system 900 includes a translator assembly 902, a film source spool 912, a film uptake spool 916, and a film 918. The translator assembly 902 also includes the nanofiber yarn dispenser 500, although it will be appreciated that the nanofiber yarn dispenser 500 is shown here only for convenience and that any of the embodiments described herein can be used as a nanofiber yarn dispenser within the system 900.

The translator assembly 902 includes two translator mechanism shown in more detail in FIG. 9B: a coarse adjustment translator 904 and a fine adjustment translator 909. The coarse adjustment translator 904 can include a screw-type or servo type mechanism that moves the entire translator assembly 902 back and forth in the direction indicated in FIG. 9B by the associated arrows. It will be appreciated that other types of mechanisms may be used to move the translator assembly back and forth in the direction indicated. Using this type of mechanism, the translator assembly 904 can be moved across the film 918 (described below) in large increments of from 0.5 cm to 1 meter at speeds on the order of 1 meter per second.

The fine adjustment translator 909 is attached to the nanofiber yarn dispenser 500 and includes a piezoelectric actuator 908 that is in mechanical communication with a flexible dispensing tube 910. The piezoelectric actuator 908 can apply small displacements (on the order of microns) that flex the flexible dispensing tube 910 small amounts (e.g., from 100 microns to 5 millimeters depending on the flexibility of the dispensing tube 910 and the length of the dispensing tube 910). Analogous to the coarse adjustment translator 904, the piezoelectric actuator 908 can cause displacements to the tube that occur on the order of microseconds to milliseconds. In another embodiment, an electromagnetic actuator is connected to the dispensing tube 910 instead of the piezoelectric actuator. Regardless, the fine adjustment translator 909 can make translations on a frequency of kilohertz and thus can cause frequent and dimensionally fine changes in the direction of the dispensing tube 910 and thus of the applied nanofiber yarn.

During movement of the film 918, the coordinated translations exerted by the coarse adjustment translator 904 on the on the nanofiber dispenser 500 and by the fine adjustment translator 909 on the dispensing tube 910 can cause a nanofiber yarn 514 to be applied to a film 918 in large-scale sinusoidal patterns 920 with wavelengths and amplitudes on the order of centimeters or meters and small-scale sinusoidal patterns 922 with wavelengths and amplitudes on the order of microns or millimeters.

Examples of materials used for the flexible dispensing tube 910 include polyethylene tubing, polytetrafluroethylene tubing, stainless steel tubing, among others. The material used for the flexible dispensing tube 910 can be selected based on the flexural modulus of the material, the inside and/or outside diameter of the tube, and ultimately, the ability of the fine adjustment translator 909 (and the piezo-electric actuator 908) to cause a movement of a desired magnitude in the flexible dispensing tube 910.

While the example shown in FIGS. 9A and 9B depict an example in which film 918 is moved from the film source spool 912 to the film update spool 916, it will be understood that this is not necessarily the case. Patterns other than the sinusoidal patterns shown in FIG. 9B can be fabricated when moving the film 918 both to and from the film source spool 912 during application of nanofiber yarn 514 using the translator assembly 902. Even closed-form shapes (circles, triangles, squares, irregular polygons, and amorphous shapes) can be formed by selectively moving the film 918 to and from the film source spool 912 during application of the nanofiber yarn 500 and translation of the dispenser 500.

It will be appreciated that the embodiments shown and described as FIGS. 8A, 8B, 9A, and 9B can be combined together, and can be combined in any configuration with any of the preceding examples shown and described in the context of FIGS. 1-7B.

Figure 10A:
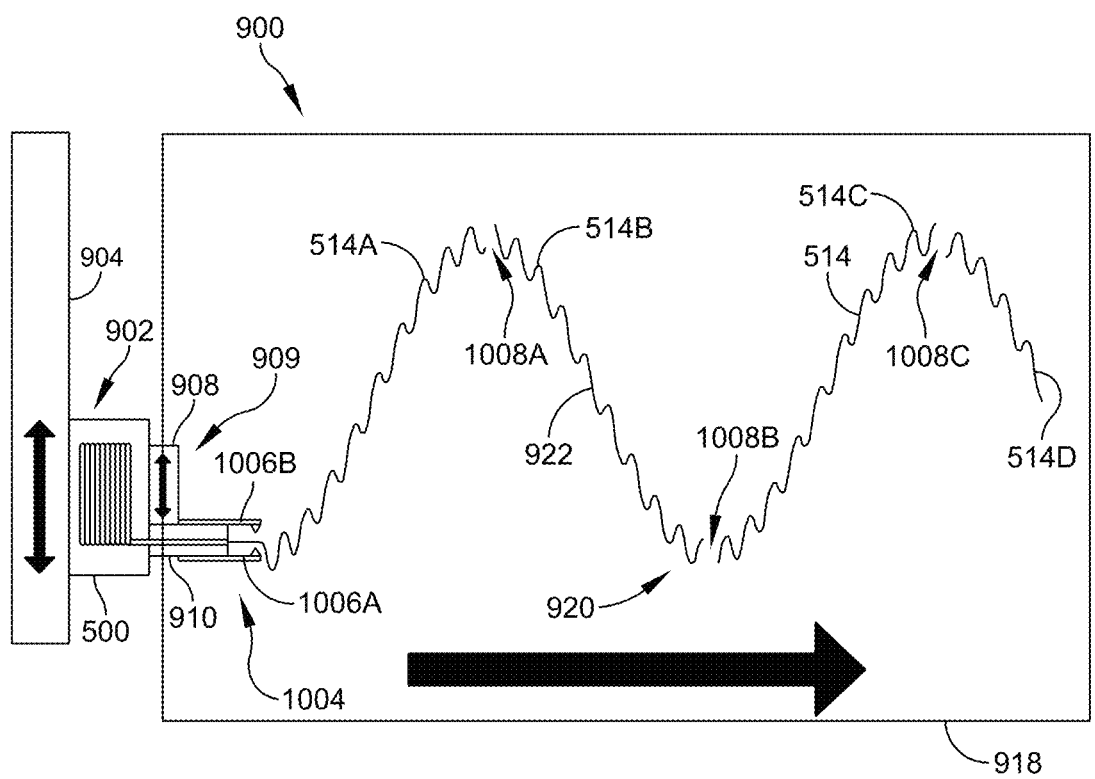
FIG. 10A illustrates a plan view of the assembly of FIG. 9A that also includes a non-contact mechanism for cutting a nanofiber yarn during application of the nanofiber yarn to a substrate, in an embodiment.
Figure 10B:
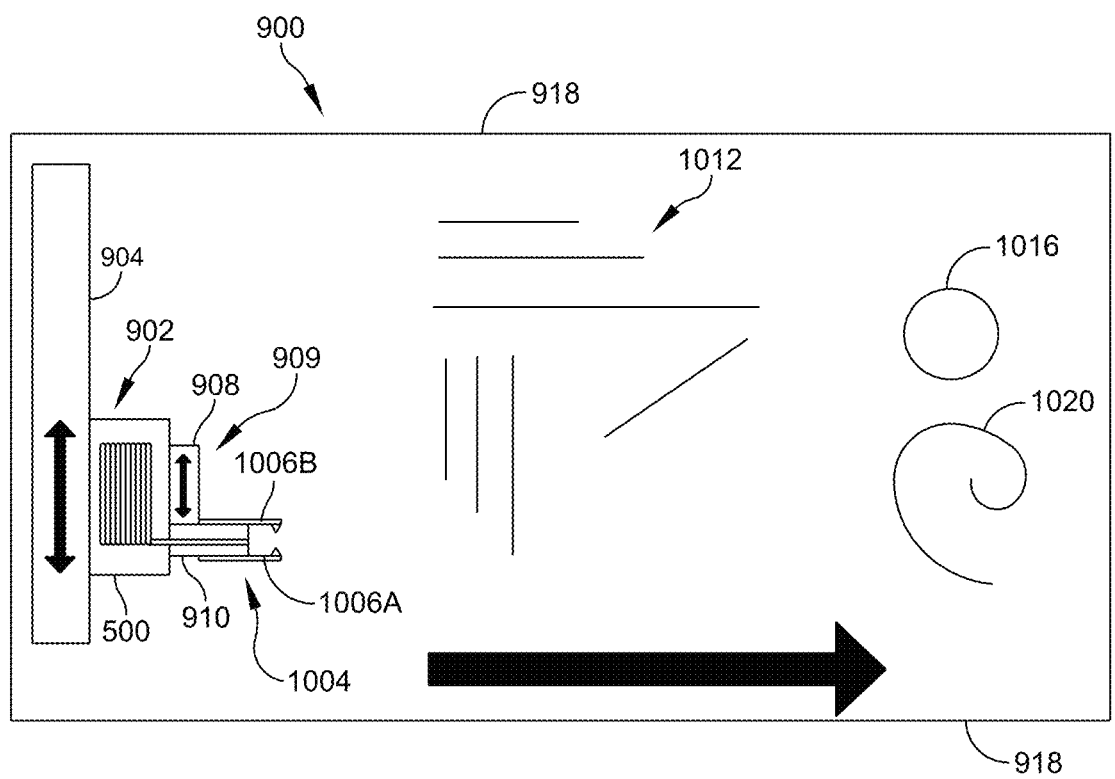
FIG. 10B illustrates a plan view of alternative patterns in which nanofiber yarns can be applied using the assembly of FIG. 10A, in an embodiment.

In an embodiment depicted in FIGS. 10A and 10B, the system 900 includes a non-contact nanofiber yarn cutting system 1004. In the example shown, the system 1004 includes two electrodes 1006A and 1006B that can be used to cut the nanofiber yarn 514 into yarn segments. This enables discontinuous yarn segments to be applied to the film 918, such as those shown as yarn segments 514A, 514B, 514C, and 514D which are separated by gaps 1008A, 1008B, and 1008C. FIG. 10B also exhibits other examples of discontinuous and continuous yarn segment conformations, such as linear segments 1012 that can be orthogonally and diagonally oriented to one another, a closed form shape 1016, and a spiral 1020. In additional embodiments, yarn segments may be laid across previously deposited yarn segments. Two, three, four or more layers of yarn segments can be deposited. In one embodiment, additional segments may be deposited at about 90 degrees to the existing segments in order to provide a cross hatched pattern. In some cases, yarn segments can be cut at the junction of the underlying yarn to avoid contact with previously deposited segments. In these embodiments, one group of yarn segments may be continuous and another group may be discontinuous. In other cases, where contact is desirable, the yarn can be deposited directly and continuously over the previous applied layers.

The non-contact cutting system 1004 can use any of a variety of technologies. For example, electrodes 1006A and 1006B can be connected to a power source so as to form an electrical arc that, when spanning the distance between the electrodes 1006A and 1006B, removes material from the nanofiber yarn 514 thus cutting it. It will be appreciated that other types of non-contact cutting system 1004 can be used. For example, a single electrode (e.g., 1006A) can be used to form an electrical arc between the single electrode and the nanofiber yarn 514 that cuts the nanofiber yarn. In another embodiment, one or more electrodes can be configured to produce coronas that cut or otherwise sever the nanofiber yarn 514. The one or more electrodes are then connected to an electrical power source and controller, including but not limited to a power supply and controller of an electrical discharge machining apparatus (EDC), an arc welder, a plasma cutter (which may also include a plasma gas source), and other similar devices. It will also be appreciated that the electrodes can be in a fixed position relative to the nanofiber yarn 514 or can be moved relative to the nanofiber yarn 514 so as to encourage or discourage electrical arcing.

An alternative embodiment, the non-contact cutting system 1004 is that of a laser system. In this alternative, structures 1006A and 1006B provide focused laser energy to a point on the nanofiber yarn 514 that cuts or severs the yarn into segments, as described above.

In still other embodiments, contact cutting systems can be used. In one example, a high-temperature electrical resistor or other source of thermal energy can also be used to cut the nanofiber yarn 514 when the resistor is brought close to the nanofiber yarn. Various other guillotine type or scissor type blade arrangements can be used in other embodiments.

Regardless of the type of non-contact cutting system 1004 that is employed, when result is the ability to apply micron scale diameter or submicron scale diameter nanofibers or nanofiber yarns to the film 918 arranged in a parallel fashion and separated by spaces that are as small as 100 µm.

Applications

One application of the dispenser 500 (or of the dispenser 700) described above, and variations that will be apparent in light of the present disclosure, is as a device by which to a conductive pathway is applied onto a surface. While metallic wires and tapes (e.g., steel, copper, aluminum) can be applied to a surface, these are difficult to adhere to a surface. Metallic wires and tapes also have a high enough modulus of elasticity that changing direction of the metallic wire or tape using a curve with a small radius of curvature (e.g., less than 2 cm) is difficult. Conductive inks can overcome these challenges of metallic wires and tapes, but require drying time and cannot easily conform to a non-uniform topography (e.g. a surface with peaks and valleys). Conductive inks also are more limited in the underlying substrate that they can be applied to. Nanofiber wires, as described above, can be easily applied and adhered to a surface even with abrupt changes in direction using curves with vary small radii of curvature.

One application includes charging the hermetically sealed housing 504 with a positive pressure of gas and sealing the outlet 536 around a nanofiber yarn 514 disposed therethrough. Upon release of the seal at the outlet 536, the nanofiber yarn 514 can be projected by gas flow from the housing. In some cases, the free end of the nanofiber yarn 514 can be attached to a small projectile. This configuration can be applied to, for example, a captive bolt pistol (also known as a stunbolt gun, a bolt gun, a stunner, such as a TASER®) and other devices for remotely delivering an electrical signal, which is conducted through the nanofiber yarn 514.

Alternatively the device may incorporate magnetic materials so that the bobbin can be made to rotate in a magnetic field. These embodiments may allow the devices to be manufactured, and repeatedly reused.

Summary

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An apparatus comprising:
a housing defining an inlet, an outlet, and a chamber;
a pressurized gas source connected to the housing and in communication with the inlet;
a spool disposed within the chamber; and
a nanofiber wrapped around the spool, the nanofiber having an average diameter of less than 1 micron.

2. The apparatus of claim 1, wherein the housing includes a hermetic seal except for the inlet and the outlet, the hermetic seal configured to prevent infiltration of fluid into the chamber except through the inlet and the outlet.

3. The apparatus of claim 1, wherein the outlet is dimensioned to prevent infiltration of water at 1 atmosphere of pressure into the housing through the outlet, wherein an inner diameter of the outlet is between 10 μm and 300 μm.

4. The apparatus of claim 1, wherein the housing further includes a fluid disposed within the chamber.

5. The apparatus of claim 4, wherein the fluid is an adhesive.

6. The apparatus of claim 1, further comprising a nozzle connected to the housing, the nozzle defining a channel that is in communication with the outlet.

7. The apparatus of claim 6, further comprising a liner disposed within the channel.

8. The apparatus of claim 7, wherein the liner has an inner diameter dimensioned to prevent infiltration of water at 1 atmosphere of pressure, wherein a diameter of the liner is between 90 μm and 130 μm.

9. The apparatus of claim 8, further comprising a fluid flowing within the channel, and wherein a length of the liner is less than a length of the channel.

10. The apparatus of claim 1, wherein the nanofiber wrapped around the spool has a free end proximate to the outlet of the housing and a fixed end proximate to the spool.

11. The apparatus of claim 10, wherein the nanofiber comprises a carbon nanofiber yarn having a cross-sectional diameter of less than 1 micron and a length between the free end and the fixed end of at least 1 km, at least a portion of the length wound around the spool.

12. The apparatus of claim 1, wherein the nanofiber comprises a carbon nanofiber yarn further comprising two or more individual nanofibers or nanofiber yarns that are twisted together to form a plied nanofiber yarn.

13. The apparatus of claim 12, wherein the plied nanofiber yarn has a diameter from 0.5 microns to 100 microns.

14. The apparatus of claim 1, further comprising a roller assembly.

15. The apparatus of claim 14, wherein the roller assembly further comprises:
a first support;
a first spindle connected to the first support; and
a first roller disposed around at least a portion of the first spindle.

16. The apparatus of claim 15, wherein the roller assembly further comprises:
a second support;
a second spindle connected to the second support;
a second roller disposed around at least a portion of the second spindle; and
a belt disposed around the first roller and the second roller.

17. The apparatus of claim 15, further comprising:
a connector connected to at least one of the housing and a nozzle connected to the housing; and
a drive shaft attached to the connector.

18. The apparatus of claim 17, wherein a longitudinal axis of the drive shaft intersects a reference axis between a center point of the housing and a center point of the roller proximate to the roller, wherein a radius of a cross-section of the drive shaft is less than a length measured from a center point of the roller to a corresponding point on a housing perimeter that is projected onto an underlying surface.

19. The apparatus of claim 1, further comprising:
a connector connected to at least one of the housing and a nozzle; and
a drive rod attached to the connector.

* * * * *